No. 846,905. PATENTED MAR. 12, 1907.
H. L. BRUEN.
CONNECTION FOR BATH SPRAYS AND THE LIKE.
APPLICATION FILED NOV. 22, 1905.
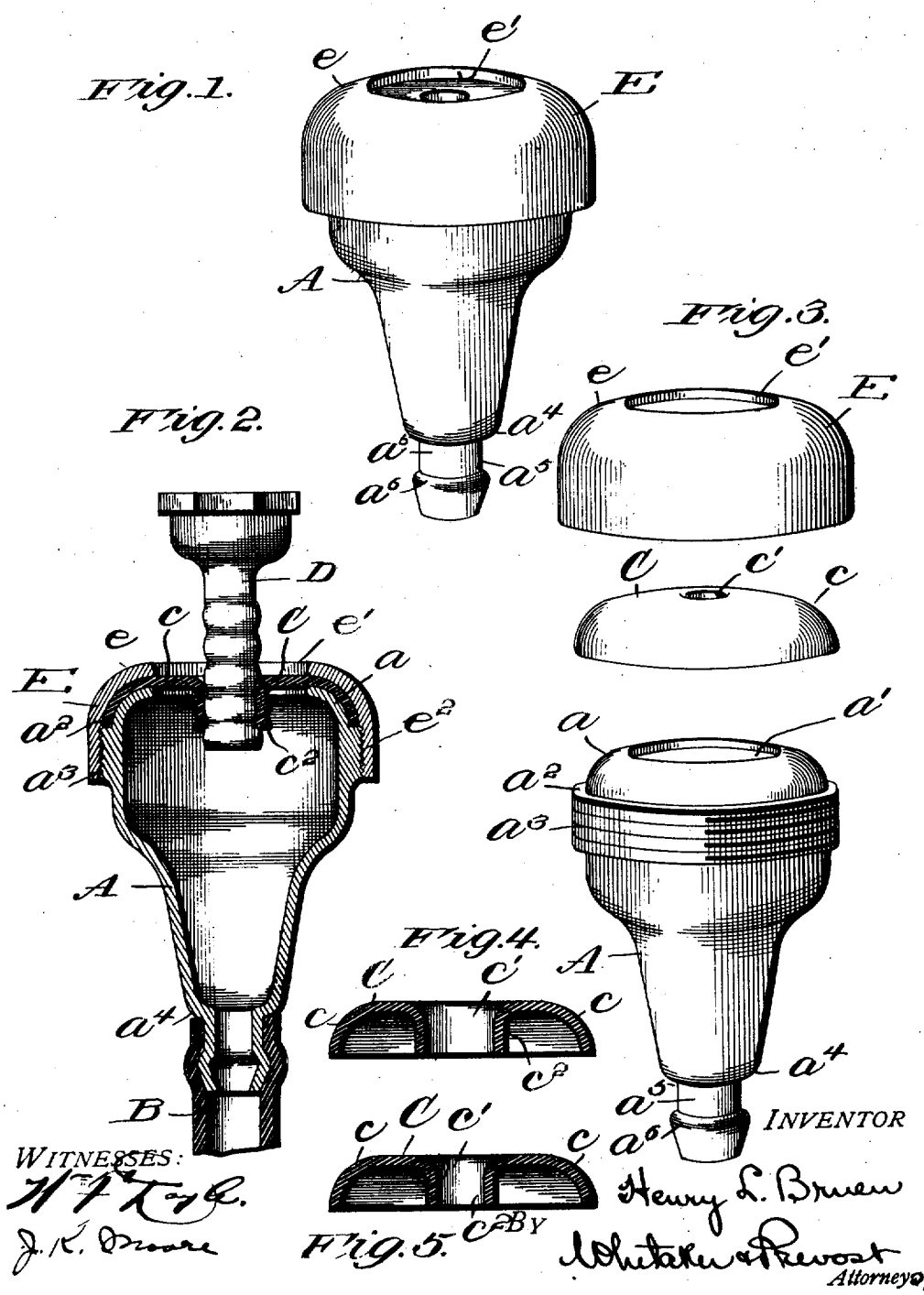
INVENTOR
Henry L. Bruen
BY Whitaker & Prevost
Attorneys
WITNESSES:

UNITED STATES PATENT OFFICE.

HENRY L. BRUEN, OF ORANGE, NEW JERSEY, ASSIGNOR TO THE VANT WOUD RUBBER COMPANY, OF NEW YORK, N. Y.

CONNECTION FOR BATH-SPRAYS AND THE LIKE.

No. 846,905.      Specification of Letters Patent.      Patented March 12, 1907.

Application filed November 22, 1905. Serial No. 288,593.

*To all whom it may concern:*

Be it known that I, HENRY L. BRUEN, a citizen of the United States, residing at Orange, in the county of Essex and State of New Jersey, have invented certain new and useful Improvements in Connections for Bath-Sprays and the Like; and I do hereby declare the following to be a full, clear, and exact description of the invention, such as will enable others skilled in the art to which it appertains to make and use the same.

My invention consists in the novel features hereinafter described, reference being had to the accompanying drawing, which illustrates one form in which I have contemplated embodying my invention, and the said invention is fully disclosed in the following description and claim.

Referring to the drawing, Figure 1 is a perspective view of my improved connection for bath-sprays and the like, showing the same detached. Fig. 2 is a longitudinal sectional view of the same, showing it attached to a reducer or nozzle and also showing a portion of the rubber tubing attached to the connection. Fig. 3 is a perspective view of the connection, showing the parts of the device separated; and Fig. 4 is a sectional view of a rubber washer or gasket adapted for use with the device. Fig. 5 is a similar view of a washer or gasket having a smaller central aperture than that shown in Fig. 4.

The object of my invention is to provide a connection for use with bath-sprays and other devices intended to be connected to the spigot of a bath-tub or washstand so constructed that it can be readily adapted for use with the ordinary reducer or spigot, whatever the size of the spigot may be.

A represents the main body of the connection, which is hollow and is formed of metal, which may be cast or spun or otherwise brought into the required shape. The upper end of the main body A is provided with a substantially hemispherical seat $a$, having an aperture $a'$ in the center. Below the hemispherical seat $a$ is a shoulder $a^2$, below which is a cylindrical portion $a^3$, provided with screw-threads, as shown. Below the threaded portion $a^3$ the main body is contracted, as shown, the lower portions tapering to a shoulder $a^4$, from which a nipple $a^5$, having an enlarged portion $a^6$, projects for the attachment of a section of rubber tubing (indicated at B) connected with a bath-spray or any other device. The shoulder $a^4$ is substantially the width of the wall of the rubber tubing, so that when the tubing is in place it forms a substantially flush joint with the wall of the main body A, as shown in Fig. 2.

C represents a removable gasket or washer, which is preferably made of molded rubber in the form shown in the drawings. The outer flange $c$ of this gasket is shaped substantially hemispherically to accurately fit over the spherical seat $a$ of the body A, and the central portion of the gasket is provided with a central opening $c'$, having inwardly-extending edges forming a central flange $c^2$ to surround and engage a reducer or spigot D, as indicated in Fig. 2. The central aperture of the gasket is considerably smaller than the central opening $a'$ in the seat $a$.

E represents a metal cap which has a substantially hemispherical upper portion $e$ of the same curvature as the hemispherical seat $a$ and a central aperture $e'$ of substantially the same diameter as the aperture $a'$ in the body A. The lower portion of the cap E is cylindrical and is internally screw-threaded, as shown at $e^2$, to fit the threaded portion $a^3$ of the main body A.

In assembling the parts of the device a washer or gasket C, having a central aperture of the desired size to fit the reducer D with which the bath-spray or other device is to be employed, is placed upon the hemispherical seat $a$ of the main body, and the cap E is placed over said washer and screwed down upon the main body, as shown in Fig. 2, so as to clamp the entire marginal portion of the washer or gasket between the seat $a$ and the upper part of the cap, as clearly shown in Fig. 2, thus forming a water-tight joint and affording a large amount of surface for clamping the gasket in position.

As the main body A is reduced in diameter immediately below the threaded portion $a^3$, there is nothing to stop the cap E as it is screwed on, and it will be screwed down sufficiently tight to clamp the rubber gasket firmly, thus insuring a tight joint even though the rubber gasket may vary slightly in thickness. The edges of the apertures $a'$ and $e'$ in the main body A and cap E, respectively, are smoothly rounded, as shown in Fig. 2, so that no sharp edges are presented to the rubber, and the spherical seat $a$ also supports the rubber up to a point quite near the central aperture c' therein, thus insuring the durability of the rubber gasket. The rubber gasket C will be made with central apertures of different sizes suitable for spigots or reducers D of varying diameters, as indicated in Figs. 4 and 5, so that when a bath-spray or other device provided with this improved connection is sold the connection may be quickly and readily provided with a gasket or washer having a central aperture of the desired size to fit the spigot or reducers with which it is to be used, or the connection may be provided with one size of gasket, and additional gaskets having different-sized apertures may be furnished with the device, so that the purchaser may select whichever one may be desired for use.

What I claim, and desire to secure by Letters Patent, is—

A hose connection for bath-sprays and the like comprising a hollow rigid main body provided at one end with a substantially hemispherical wall, having a central aperture therein, and at the other end with a nipple to receive a hose, the lateral walls of said main body being imperforate and provided adjacent to said hemispherical wall with an annular externally-screw-threaded portion parallel to the axis of said main body, a removable gasket of rubber consisting of a substantially hemispherical portion fitting over the hemispherical end wall of said main body, and having a central aperture therein of less diameter than that of the aperture in said end wall, and a cap consisting of a substantially hemispherical portion to fit over said gasket provided with a central aperture registering with that of the main body and having an annular flange extending from the edge of said hemispherical portion and internally screw-threaded to engage the exterior threaded portion of said main body, whereby the entire marginal portions of said gasket are clamped between the end wall of said main body and said cap, substantially as described.

In testimony whereof I affix my signature in the presence of two witnesses.

HENRY L. BRUEN.

Witnesses:
   THEODORE B. BRIGGS, Jr.,
   JOHN E. BULLWINKEL.